UNITED STATES PATENT OFFICE.

RICHARD GUENTHER, OF OSHKOSH, WISCONSIN.

IMPROVEMENT IN THE MANUFACTURE OF DRY SOLUBLE SILICA.

Specification forming part of Letters Patent No. 151,219, dated May 26, 1874; application filed January 26, 1874.

*To all whom it may concern:*

Be it known that I, RICHARD GUENTHER, of Oshkosh, in the county of Winnebago, in the State of Wisconsin, have invented a new process for readily freeing liquid glass, or silicate of soda or potash, of water, and thereby rendering it easily pulverizable, of which the following is a specification:

The nature of my invention consists in melting a quantity of hyposulphite of soda—say, about one hundred pounds—till the water of crystallization is nearly evaporated, but the salt still liquid. Into this hot liquid pour a quantity—say, about one hundred and twenty-five pounds—of concentrated liquid glass. Stir up for some time. The hyposulphite of soda takes up the water of the liquid glass, causing this to coagulate. Take out the coagulated silicate of soda or potash and free the same of the adhering solution of the hyposulphite of soda by pressure, while it is yet warm. After cooling, the silicate is put in a mill and pulverized. This solution of the hyposulphite of soda is evaporated again, and used again for the same purpose of freeing liquid glass of water. The obtained powder of soluble glass or silicate of soda or potash dissolves in boiling water, and can be brought to any density required.

This powder is superior to the silicate in liquid form as it is found in commerce, because it is more easily handled and more cheaply transported. It is also a permanent powder which will not undergo decomposition, as the liquid glass will when exposed to air.

In patent 134,139, issued to me December 24, 1872, I described a process for drying silicate, which is very tedious and takes much time. By my present process the powder is very readily obtained without adding materially to the cost.

I am aware of patent No. 38,449, and do not therefore claim anything contained therein; but

Having thus fully described my invention, what I do claim and desire to secure by Letters Patent, is—

The process herein described of freeing liquid glass of water, and rendering it thereby pulverizable by the ingredients and in the proportions substantially as described.

RICHARD GUENTHER.

Witnesses:
WORTHIE H. PATTON,
A. K. OSBORN.